United States Patent

[11] 3,578,108

| [72] | Inventor | Charles Knapp McConnell<br>Creve Coeur, Mo. |
|---|---|---|
| [21] | Appl. No. | 800,622 |
| [22] | Filed | Feb. 19, 1969 |
| [45] | Patented | May 11, 1971 |
| [73] | Assignee | ACF Industries, Incorporated<br>New York, N.Y. |

[54] AUTOMOTIVE CRUISE CONTROL SYSTEM HAVING FLUIDIC CONTROL DEVICES
11 Claims, 10 Drawing Figs.

[52] U.S. Cl. .................................................. 180/106,
180/108, 123/103, 137/81.5, 137/83, 137/47
[51] Int. Cl. ....................................................... B60k 31/00
[50] Field of Search.................................... 180/105-
—109; 123/103; 137/81.5, 47, 83; 416/15

[56] References Cited
UNITED STATES PATENTS

| 2,679,240 | 5/1954 | Ong et al. ..................... | 123/103 |
| 3,092,090 | 6/1963 | Berninger..................... | 180/108X |
| 3,229,546 | 1/1966 | Nallinger et al. ............. | 180/105 |
| 3,233,522 | 2/1966 | Stern............................ | 137/81.5X |
| 3,260,271 | 7/1966 | Katz............................. | 137/81.5X |
| 3,340,952 | 9/1967 | Day.............................. | 180/108 |
| 3,482,696 | 12/1969 | Jones........................... | 137/81.5X |

*Primary Examiner*—Kenneth H. Betts
*Attorney*—Edward H. Casey

ABSTRACT: A cruise control system for an automotive vehicle maintains a selected speed. The system has a fluid amplifier control unit which includes a disc rotated by the speedometer and having a pair of openings or gates. A pair of fluid orifices adjacent the disc are angularly adjustable to set the desired speed. When the speed departs from the selected value fluid is supplied through one or the other of the gates and orifices to one side or the other of the fluidic amplifier. The fluid amplifier then operates switching means for a reversible electric motor to increase or decrease the speed of the vehicle. During braking the cruise control system is made inoperative. A thermal relay, in one embodiment of the invention, produces a time delay between an overspeed and a closing of the throttle to correct the overspeed, thereby permitting a desired acceleration for a predetermined time. In another embodiment a warning signal device is actuated when the preset speed is exceeded.

INVENTOR
C. K. McCONNELL
BY Edward H Casey
ATTORNEY

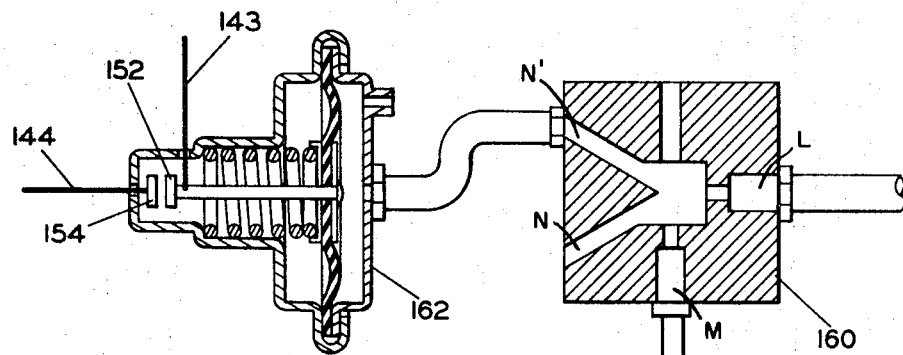
FIG. 10.
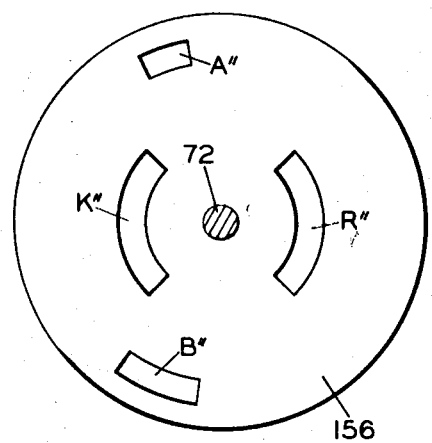
FIG. 9.
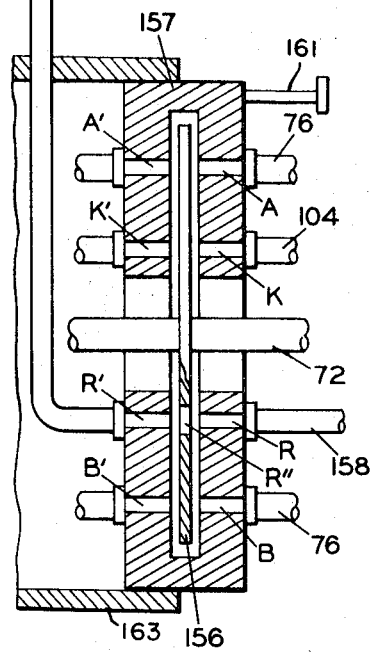
INVENTOR
C.K. McCONNELL
BY Edward H Casey
ATTORNEY

AUTOMOTIVE CRUISE CONTROL SYSTEM HAVING FLUIDIC CONTROL DEVICES

BACKGROUND OF THE INVENTION

Automotive cruise control systems are known having means for maintaining a selected speed after the car has been brought to that speed. The selected speed can be exceeded by depressing the accelerator pedal, and speed can be reduced by the brake pedal, which also inactivates the cruise control system. The known systems may be turned on or off by switches and may serve to warn the driver of excessive speed.

The invention is designed to overcome some drawbacks of previous systems, which use electronic circuits of considerable complexity. The system includes "overrides" which permit acceleration or braking, and also may provide speed-limiting and/or a definite speed-warning signal.

SUMMARY OF THE INVENTION

The cruise control system of the invention includes a reversible motor adapted to be connected by an electrically operated clutch to a control lever which has a link extending to a second lever fixed to the throttle of the carburetor. Thus, the motor is adapted to adjust the throttle to control the engine speed. A fluidic control unit includes a disc driven from the speedometer and provided with a pair of gates or openings. An air pressure unit has a pair of channels, called fluidic eyes, and is rotatable to set a desired speed. When one of the gates registers with one of the fluidic eyes, a fluidic amplifier is operated to actuate a switch which supplies a signal to the motor and causes it to turn in one direction. When the other fluidic eye comes into registry with the other gate, the motor is caused to turn in the other direction. Thus, the speed of the engine is increased or decreased to bring it toward the preset speed. A clutch is deenergized when the brake pedal is depressed, to prevent the system from operating during braking.

In a modification of the system, the disc rotated by the speedometer shaft has a third gate adapted to register with another set of fluidic eyes to operate a fluidic switching device to set off a warning signal with the preset speed is exceeded.

In still another embodiment, the disc has a fourth gate and another fluidic switching device connected to a time delay relay which operates after the preset speed has been exceeded for a given time. The relay causes the cruise control system to become inoperative, but enables the motor through other linkage to begin closing the throttle to reduce the engine speed.

BRIEF DESCRIPTION OF THE DRAWING

The invention is illustrated in the following FIGS. of the drawing:

FIG. 9 is a plan view of the disc for the system of FIG. 7.
FIG. 10 is a diagram of the fluidic control apparatus for producing the speed-limiting function of FIG. 7.

DESCRIPTION OF THE PREFERRED EMBODIMENTS

Figure 1:
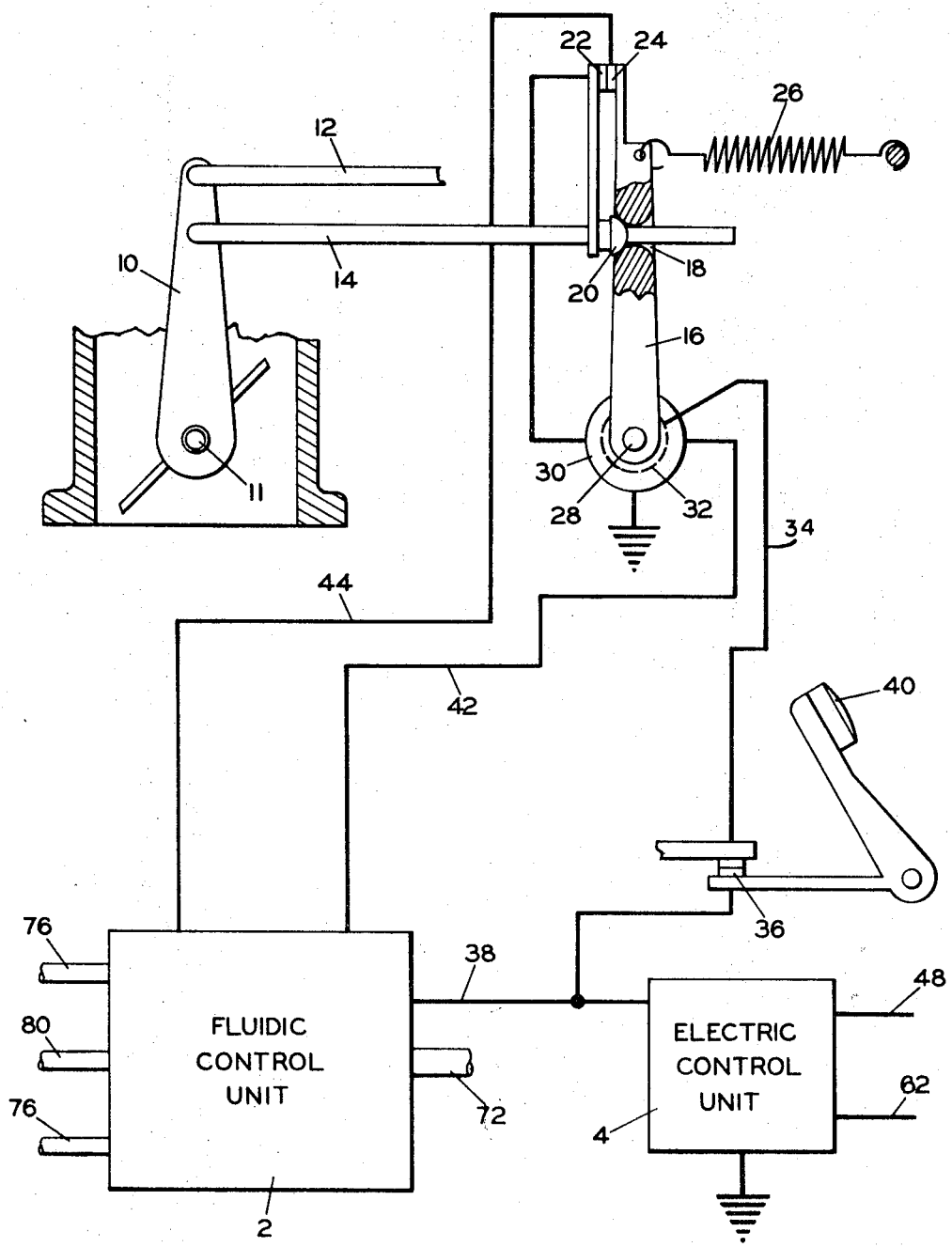
FIG. 1 is a general schematic of the cruise control system.
Figures 2, 3:
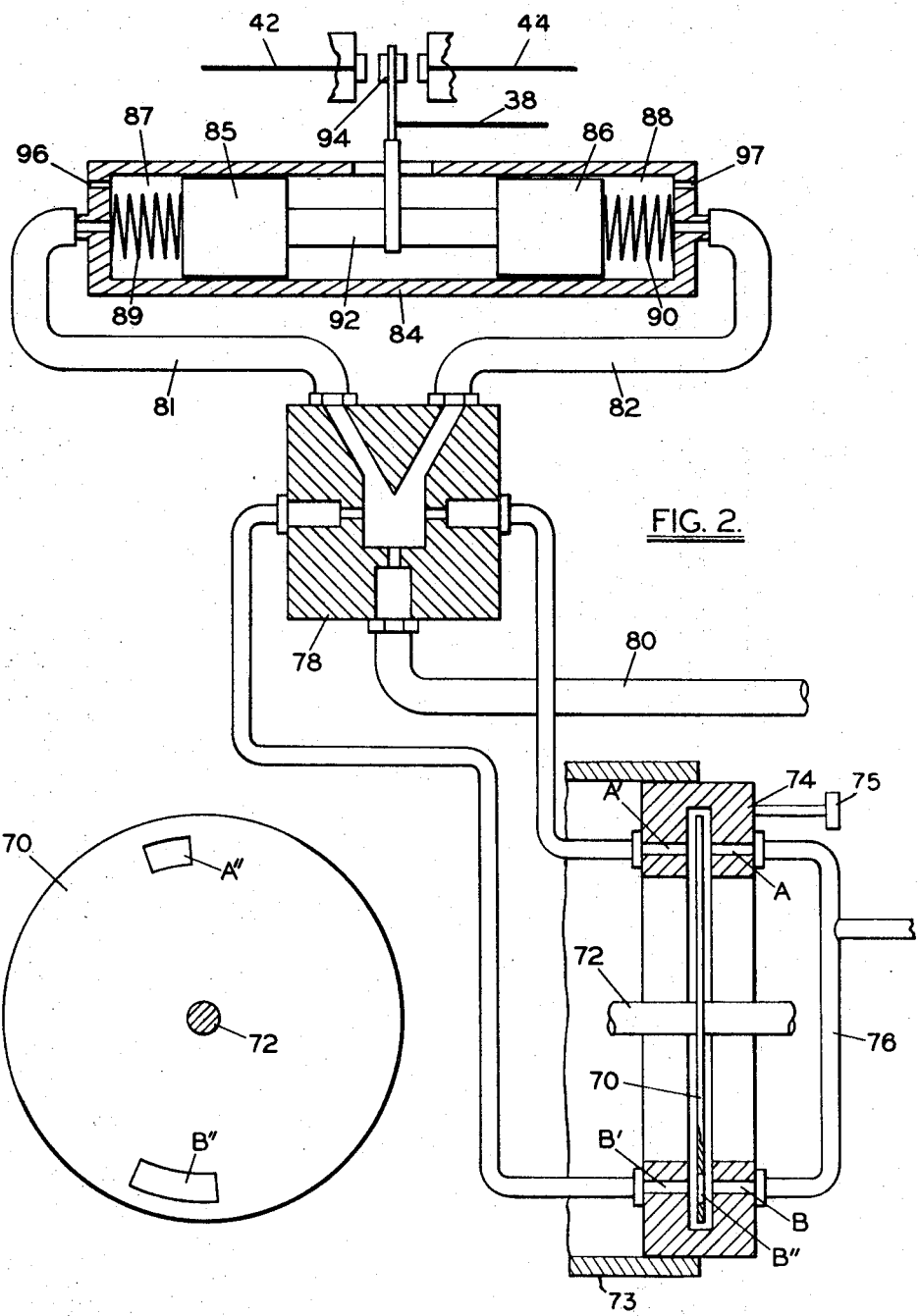
FIG. 2 is a schematic diagram of the fluidic control unit.
FIG. 3 is a plan view of a disc used in the fluidic portion of the system.
Figure 4:
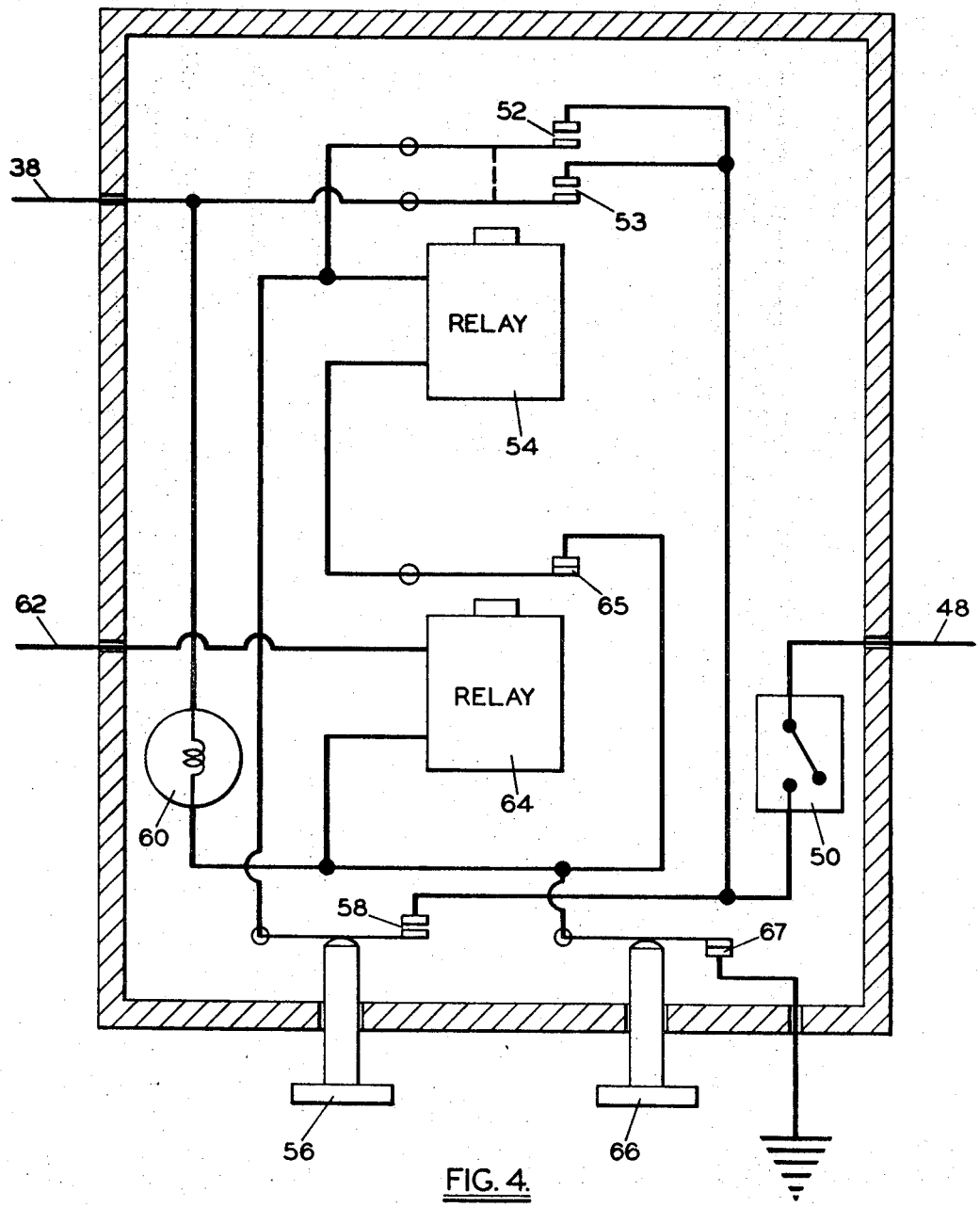
FIG. 4 is a schematic diagram of the electrical control unit.

The essential elements of the embodiment of the invention shown in FIG. 1 include a fluidic control unit 2 and an electric control unit 4, which are illustrated in greater detail in FIGS. 2 and 4, respectively. These units are designed to control throttle lever 10 fixed to shaft 11, to provide a speed governor for an automobile. Lever 10 is connected by link 12 to the accelerator pedal (not shown) and has a link 14 connecting it to control lever 16. Link 14 extends through opening 18 in lever 16 and has a collar 20 seated in the opening. Collar 20 carries contact 22, insulated from link 14, while contact 24 is fixed to lever 16. The latter is biased to the throttle-closing position by spring 26. Lever 16 is mounted on shaft 28, which is coupled to motor 30 through electrical clutch 32. Current is supplied to clutch 32 by lead 34 through switch 36 from line 38, so that stepping on brake pedal 40 causes opening of switch 36 and deenergization of clutch 32, and a return of lever 16 by spring 26 to the engine-idling position. Current for driving motor 30 to open the throttle is supplied by line 42, and current for driving motor 30 to close the throttle is supplied by line 44 through switch 22, 24.

Referring now more particularly to FIG. 4, power is supplied by line 48 to switch 50. Contacts 52, 53 of relay 54 remain open until the relay is energized by closing manual switch 56 momentarily to close contacts 58. Relay 54 then stays closed by the current through contacts 52, and current is put on line 38 by closed contacts 53, and pilot light 60 is lit. Line 62 extends to the automobile starter circuit, so that closing of the starter switch puts current through line 62 and energizes relay 64, opening contacts 65 thereof, thereby opening the connection between relay 54 and ground, and disconnecting line 38 from the source of current. Thus, the cruise control circuit is deenergized during engine starting, and may also be deenergized by pressing button 66 to open contacts 67.

The fluidic control unit 2 includes disc 70 mounted on speedometer shaft 72, or other shaft whose position corresponds to car speed. Disc 70 has a pair of openings or gates A″ or B″. Coaxial with shaft 72 is a rotatable member 74 having diametrically disposed fluid channels or eyes A, A′ and B, B′. The angular position of member 74, which may be rotated in its mounting 73 by handle or pin 75, determines the selected cruise control speed setting. Air under constant pressure is supplied to member 74 by line 76 and may be fed to eyes A′ or B′ and through gate A″ or B″ of disc 70 to one side or the other of fluidic amplifier 78 to divert an airstream supplied by conduit 80 to output line 81 or 82. These lines are connected to opposite side of transducer 84, which may include pistons 85, 86 in cylinders 87, 88, centered by springs 89, 90. Pistons 85, 86 are interconnected by rod 92, which is linked to movable contact 94. Thus, current supply line 38 is switched to line 42 or 44, depending on the output of fluidic amplifier 78, which in turn depends on the position of disc 70. Cylinders 87 and 88 have vents 96, 97.

The operation of the apparatus shown in FIGS. 1 through 4 will now be described. When the engine-starting circuit is closed, a voltage is applied to line 62 to energize relay 64. Contact 65 is therefore opened to interrupt the ground connection of relay 54. This insures that contacts 53 of relay 54 remain open and no voltage is applied to line 38. Motor 30 and clutch 32 are therefore deenergized, and the cruise control apparatus remains inoperative during engine starting. After the engine starts and the starting circuit is switched off, relay 64 is deenergized and the apparatus is ready for normal operation. To place the cruise control apparatus in operation, switch 50 is closed to activate the system. Unit 74 is then manually rotated to a position representing the desired cruising speed and pushbutton 56 is operated momentarily to close contacts 58 and energize relay 54. Contacts 52 close and relay 54 then remains energized through these contacts. As the automobile accelerates, speedometer shaft 72 turns disc 70, until gate A″ registers with fluidic eyes A and A′ when the preset cruising speed is exceeded. Air under pressure is therefore supplied to input C of fluidic amplifier 78 moving its output to outlet F and thence through conduit 81 to cylinder 87. Pistons 85 and 86 therefore move to the right and cause switch 94 to close so as to connect conductors 38 and 44. Motor 30 is then energized through contacts 22, 24 to move control lever 16, link 14, and throttle control lever 10 to the right, which is the throttle-closing direction. Thus, acceleration of the automobile beyond the preset cruising speed closes the throttle to reduce the speed.

Similarly, a drop below the cruising speed rotates disc 70 to bring gate B'' opposite fluidic eyes B and B'. It is evident then that fluidic amplifier 78 and switching device 84 will be actuated in the opposite direction and cause line 38 to be connected by switch 94 to conductor 42. The current supplied by conductor 42 will drive reversible motor 30 in the direction to move throttle lever 10 to the left and cause the engine to accelerate. Thus, the automobile will tend to maintain a speed within a predetermined range of the desired cruising speed.

Stepping on brake pedal 40 opens switch 36 to interrupt the supply of current to clutch 32. Control lever 16 is then disconnected from motor 30 and is pulled by spring 26 in the direction to close the throttle. Stepping on the accelerator pedal moves link 12 connected to the pedal to the left. This causes a similar movement of throttle lever 10 and cruise control link 14. Since contact 22, carried by member 20, is connected to link 14, contact 22 is separated from contact 24 to break the circuit between conductor 44 and motor 30, thus preventing the motor from being driven in a direction to close the throttle during acceleration. The purpose of this operation is of course to permit acceleration when necessary, even beyond the preset speed, without counteraction by the cruise control system.

The system can be disabled at any time by momentarily pressing button 66 to open contacts 67 and thus breaking the ground connection of relays 54 and 64, and the system will remain inoperative until switch 56, 57 is closed again.

It is to be mentioned that the circuit is disabled during cranking because switch 50 is also the ignition and accessory switch. Thus on cranking the energizing circuit is opened at 50 and the device is inoperative.

As explained above, it is apparent that gate A'' causes the throttle to close and that gate B'' causes the throttle to open. Accordingly when only one of these gates is in a fluidic eye, the vehicle will accelerate or decelerate as controlled by the respective gates. However, when both gates A'' and B'' are within the respective fluidic eyes, then the system reaches equilibrium and a constant speed is maintained.

Figure 6:
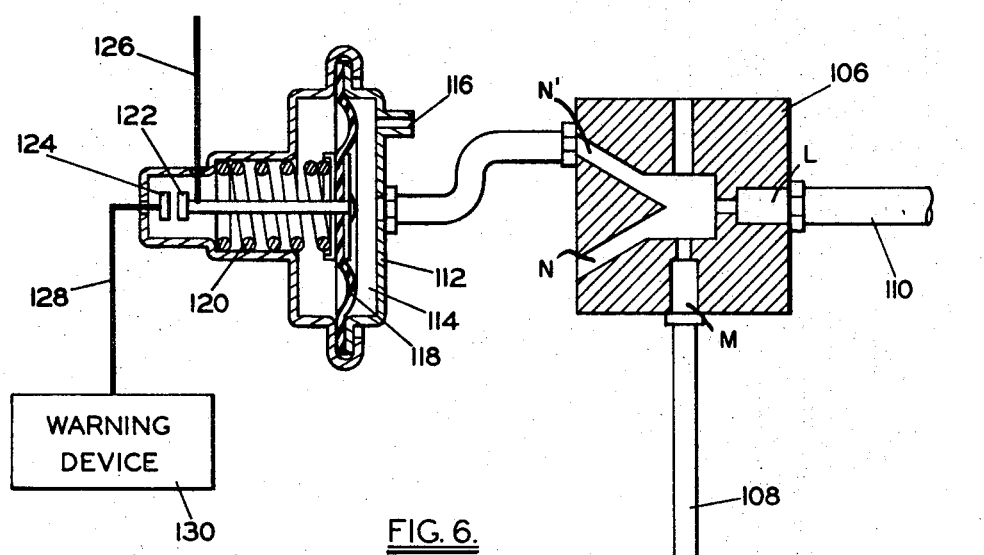
FIG. 6 is a diagram of fluidic control apparatus responsive to the additional gate in the disc of FIG. 5.
Figure 5:
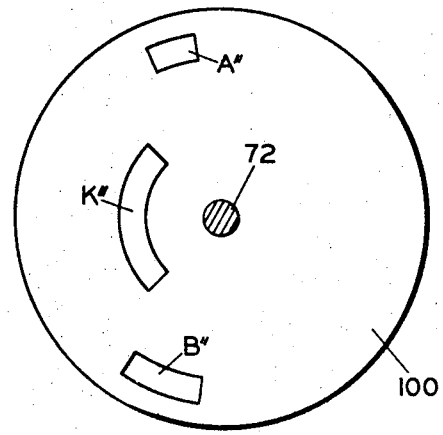
FIG. 5 is a plan view of a modified disc useful for speed warning.

FIGS. 5 and 6 show modifications of the system described above, which modifications provide an audible warning signal when the preset speed is exceeded. The general arrangement of the modified system and the electric control unit thereof are essentially the same as those of FIGS. 1 and 4. Disc 100, however, has an additional slot or gate K'' which is located radially inward of gates A'' and B'', but otherwise disc 100 is the same as disc 70. Rotatable member 102 is similar to member 74, and has additional fluidic eyes K, K' juxtaposed to gate K'' Member 102 is rotatable within a suitable mounting 103 to a desired speed setting by means of handle or pin 105. Fluid under constant pressure is supplied to member 102 by conduit 104. Fluidic device 106 is a device known in the art as a "flip-flop" with preferential outlet. In this device the airflow is from L to N in the absence of a signal at M. A signal at M delivered from member 102 by conduit 108 causes the output of switch from N to N'. Constant-pressure air is supplied by conduit 110. Transducer 112 has a chamber 114, provided with a small vent 116, bounded on one side by diaphragm 118, which is biased by spring 120 to hold switch contact 122 spaced from contact 124. Contact 122 is connected to the ignition circuit, preferably through a manual switch, not shown, by lead 126 and contact 124 has a lead 128 to an audible warning device 130. It is obvious that other pressure-operated switches may be used instead of transducer 112.

The additional apparatus shown in FIGS. 5 and 6 provide the driver with an audible warning signal when the automobile has attained or exceeded a selected preset speed. Here, again, the disc 100 is rotated by speedometer shaft 72 and has an additional gate K' which is located radially inward of fluidic gates A'' and B''. Gate K'' registers with fluidic eyes K and K' of rotatable unit 102 at the selected speed to pass pressurized air from conduit 104 through conduit 108 to control inlet M of fluidic flip-flop device 106. The latter receives a stream of air at inlet L from conduit 110. Thus, when the preset speed is attained, causing gate K'' to register with fluidic eyes K and K', the airstream which normally passes to outlet N is shifted to outlet N' and thence into chamber 114 of pressure switch 112. The pressure in chamber 114 moves diaphragm 118 upward against the bias of spring 120 to close contact 122 against fixed contact 124. This results in a supply of current through conductors 126 and 128 to the warning device 130 to apprise the driver that he is exceeding the desired speed limit. It is understood, of course, that the remainder of the cruise control system of FIGS. 1 to 4 is controlled in response to the position of fluidic gates A'' and B'', as previously described, to maintain the desired cruising speed.

Figure 7:
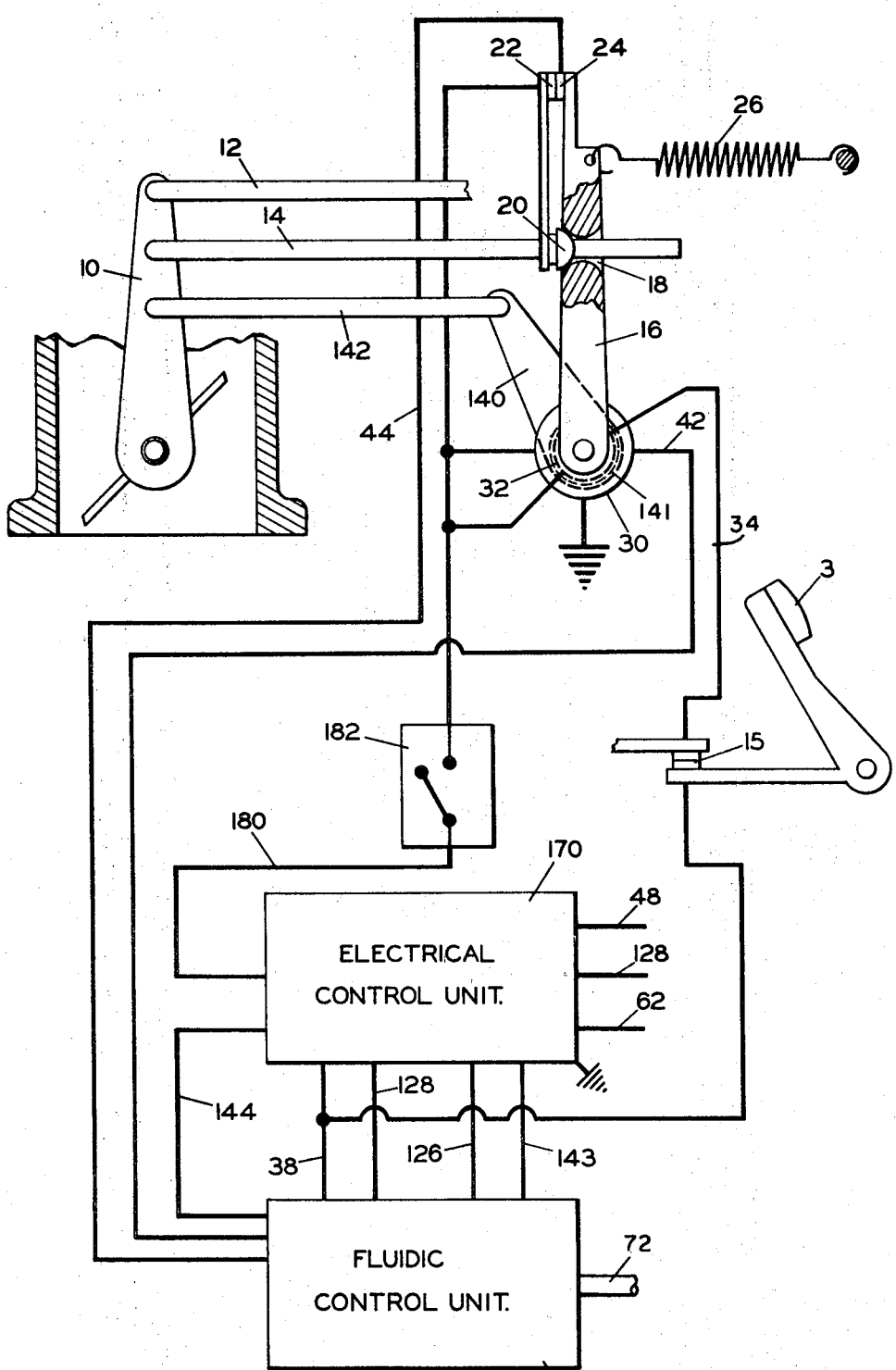
FIG. 7 is a general schematic of a cruise control system including a speed limiter.

Modifications of the system are shown in FIGS. 7 to 10 which limit the speed to a preset value, but permit acceleration to speeds above this value for a limited time. It is obvious that a flat limit at a preset speed would be undesirable. The system illustrated in FIG. 7 is comparable to that of FIG. 1, and includes elements 10 to 44 connected in substantially the same way as in FIG. 1. Throttle lever 10 is connected to a second control lever 140 by link 142, and lever 140 is connectable to the shaft of motor 30 by clutch 141. Fluidic control unit 150 includes the apparatus shown in FIG. 2 for connecting current supply line 38 to leads 42, 44, which supply current for driving motor 30 to open and close the carburetor throttle as required. Control unit 150 also includes the apparatus shown in FIG. 6 for connecting leads 126 and 128 through contacts 122, 124 to operate overspeed warning device 130. Apparatus shown in FIG. 10, substantially identical to that shown in FIG. 6, controls the connection between leads 143 and 144 through contacts 152, 154, which are similar to switch contacts 122, 124 of FIG. 6. Referring to FIGS. 9 and 10, disc 156 includes an additional gate R'', which cooperates with fluidic eyes R, R' in unit 157 to pass, or shut off, an airstream 158 as previously described. The output of unit 157 controls a fluidic flip-flop device 160 and a pressure-operated switch 162 having contacts 152, 154 for feeding current from the ignition circuit through leads 143 and 144 to thermal switch or relay 164. Unit 157 includes the elements of units 70 and shown in FIGS. 2 and 6, and has a handle 161 for rotating unit 157 within mounting 163 to a desired speed setting.

Figure 8:
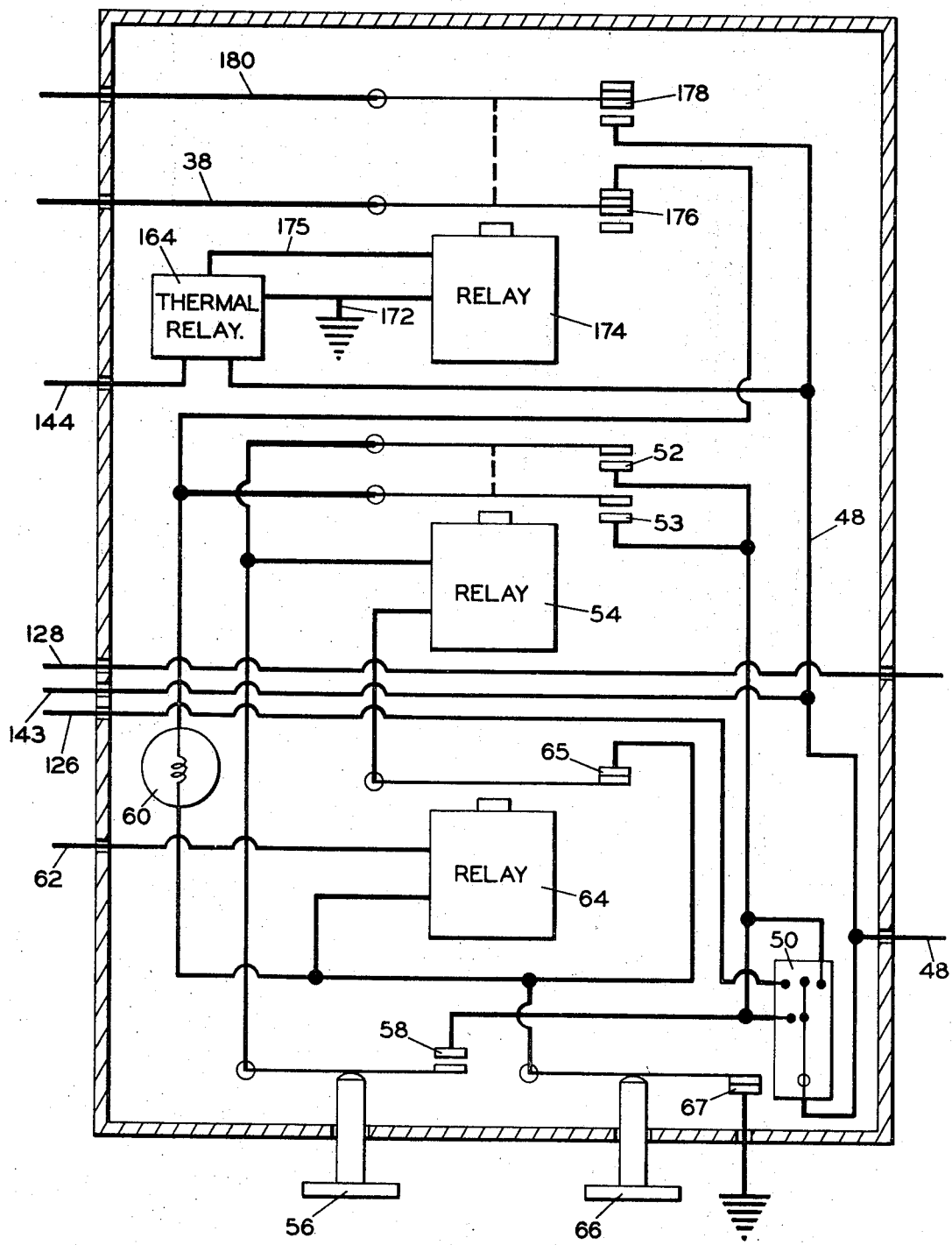
FIG. 8 is a schematic diagram of the electrical control unit utilized in the system of FIG. 7.

Thermal relay 164 is located in electrical control unit 170, which is shown in FIG. 8. The thermal relay may be of any well-known type, consisting usually of a heatable bimetallic element connected between lead 144 and ground connection 172, and adapted after heating to close switch contacts for connecting relay 174 and lead 175 to the ignition circuit via line 48. Relays 54 and 64 and switches 50, 56 and 60 and pilot light 60 are connected in the same manner as the like-numbered elements of FIG. 4. Contacts 176 of relay 174 connect line 38 through contacts 53 and switch 50 to current supply line 48. Contacts 178 connect current supply line 48 via conductor 180 and switch 182 to clutch 141 and throttle closing input terminal of motor 30, so that the speed limiter portion of the apparatus may be deenergized by means of switch 182. Conveniently switch 182 is inserted in the hydraulic brake system and is opened by an increase in hydraulic fluid pressure when the brakes are applied. It can be seen that in the normal open condition of relay 174 the cruise control portions of the circuits can be energized through contacts 176, and the speed-limiting apparatus is not energized. When the preset speed has been exceeded for a sufficient time to close thermal relay 164, thereby energizing and closing relay 174, contacts 176 open to deenergize the cruise control circuitry and energize the speed-limiting circuits 126, 141, etc. through contacts 178, and at the time motor 30 is energized to close the throttle and reduce the engine speed.

The operation of the system shown in FIGS. 7 to 10 is similar to that of FIGS. 1 to 6 and includes all the functions thereof. In addition, FIGS. 7 to 10 include apparatus which provides a speed-limiting function. For this purpose the disc 156 has a gate R" in addition to the gates shown in FIGS. 3 and 5. Gate R" is adapted to register with fluidic eyes R and R' of unit 157 when a desired speed is exceeded, and this causes a stream of air from conduit 158 to pass to the inlet M of fluidic flip-flop device 160, which is the same as device 106 of FIG. 6. In response to an input at inlet M, the output of device 160 shifts to outlet N' and actuates pressure switch 162 to close contacts 152 and 154, and thereby supplies current from lead 143 to conductor 144. This current is supplied to a thermal or other relay 164 having a desired time delay. Thus, after contacts 152 and 154 have been closed for a given time, relay 164 will close and cause current to pass from conductor 48 to conductor 175 to energize relay 174. When this occurs, contacts 176 of relay 174 are opened and the cruise control apparatus previously described in connection with FIGS. 1 to 4 is deenergized. At the same time current is provided through contacts 178 to conductor 180, and this current passes through safety switch 182 to clutch 141. Thus, upon the close of switch 182, clutch 141 is actuated to connect lever 140 to the shaft of motor 30, and current is supplied to motor 30 to drive it in the throttle-closing direction. Lever 140 then turns throttle control lever 10 in the closing direction via link 142. This action continues until the speed drops below the desired speed limit, and consequently shaft 72 rotates disc 156 until it cuts off the supply of pressurized air to fluidic device 160 to terminate the speed-limiting function. The remaining elements of the system shown in FIG. 7 are thereupon restored to their normal condition and operate as previously described in connection with FIGS. 1 to 6.

I claim:

1. A cruise control system for an automobile, comprising a fluidic amplifier, fluid supply means positionable in accordance with a selected cruising speed, fluid-gating means juxtaposed to said fluid supply means and movable relative thereto in accordance with the speed of the automobile for opening or closing said fluid supply means, means connecting said fluid supply means to a control port of said fluidic amplifier, reversible electric motor means for controlling the automobile engine speed, and means responsive to the output of said fluidic amplifier for controlling the direction of said reversible electric motor means, whereby the engine speed is regulated to maintain the selected cruising speed.

2. A system according to claim 1, wherein said fluid supply means and said fluid-gating means are rotatable about a common axis, said fluid supply means having a pair of angularly spaced fluid supply channels and said fluid-gating means having a pair of openings each adapted to register with one of said fluid supply channels at speeds respectively above and below the selected speed.

3. A system according to claim 2, wherein said fluid-gating means includes a disc connected to a shaft driven by the speedometer of the automobile, said fluidic amplifier having a pair of control ports, each supply channel of said fluid supply means being connected to one of said control ports of the fluidic amplifier.

4. A system according to claim 3, wherein said means for controlling the engine speed includes a reversible electric motor, linkage extending between said motor and the throttle valve of the carburetor of said engine, and an electric clutch connected between said motor and said linkage, and a switch in series with said electric clutch, and means for opening said switch and thereby opening said clutch in response to operation of the brake pedal of the automobile.

5. A system according to claim 4, including switching means responsive to a predetermined depression of the accelerator of the accelerator pedal for preventing said motor from being driven in the direction causing closing of the throttle valve.

6. A system according to claim 5, including manually operated switching means for connecting or disconnecting said system from a source of electric current, and means connected to the engine-starting circuit of the automobile for disconnecting said source of electric current when the engine-starting circuit is energized.

7. A system according to claim 1, comprising an overspaced warning device for producing a signal when a preset speed is exceeded, an electric circuit including switching means for energizing said warning device, and fluidic control means for closing said switching means and thereby operating said warning device when said preset speed is exceeded.

8. A system according to claim 3, comprising an overspeed warning device for producing a signal when a preset speed is exceeded, an electric circuit including switching means for energizing said warning device, fluidic control means for closing said switching means when said preset speed is exceeded said fluidic control means including another fluid supply means and an additional opening in said fluid-gating means located so as to come into registry with said other fluid supply channel when said preset speed is exceeded.

9. A speed control system for an automobile having an internal combustion engine comprising a pair of fluid channels, means including a member adjustable in accordance with a selected travel speed for causing a flow of fluid through a first of said channels when the actual speed is above the selected speed, and through the other of said channels when the actual speed is below the selected speed; a fluid amplifier having input ports connected to said channels; control means connected to the output ports of said fluid amplifier for decreasing the speed of the automobile engine in response to fluid flow through said first channel and for increasing the engine speed in response to fluid flow through the other of said channels; engine-accelerating means; and means responsive to actuation of said engine-accelerating means for preventing said control means from decreasing the speed of the engine for a predetermined time.

10. Apparatus according to claim 9, including a third fluid channel means juxtaposed to said third channel, for causing a flow of fluid therethrough when the speed of the automobile exceeds the selected speed, and means responsive to the flow of fluid in said third channel for producing a warning signal.

11. Apparatus according to claim 10, including a fourth fluid channel, means juxtaposed to said fourth fluid channel for causing a flow of fluid therethrough when the speed of the automobile exceeds the selected speed, and means responsive to the flow of fluid in said fourth channel for a predetermined time for disabling said control means and reducing the speed of the engine.